May 21, 1963 D. HURST ET AL 3,090,535

APPARATUS FOR MAINTAINING A PREDETERMINED QUANTITY OF AN ELONGATED MEDIUM AT A PREDETERMINED ZONE

Filed Nov. 23, 1959

Inventors
D. Hurst
P. D. Havard
By Glascock Downing Seebold
Attys.

3,090,535
Patented May 21, 1963

3,090,535

APPARATUS FOR MAINTAINING A PREDETERMINED QUANTITY OF AN ELONGATED MEDIUM AT A PREDETERMINED ZONE

Derek Hurst, Acton, London, and Peter David Havard, Twickenham, England, assignors to Electric & Musical Industries Limited, Hayes, England, a company of Great Britain Filed Nov. 23, 1959, Ser. No. 854,875
Claims priority, application Great Britain Nov. 26, 1958
5 Claims. (Cl. 226—26)

Figure 1:
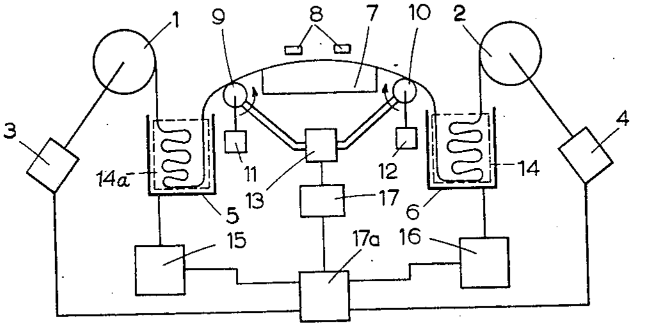

The invention relates to apparatus for maintaining a predetermined quantity of elongated medium at a predetermined zone such as in a container. The invention has particular but not exclusive reference to magnetic transducing apparatus in which the medium is in the form of magnetic tape.

In magnetic transducing apparatus such as is employed for data storage in so-called business machines, the tape may for example be 1″ wide and may be required to be driven in either direction at a speed of about 200″ per second. In such apparatus the tape is usually wound on supply spools and is fed from the spools into storage containers or bins between which the tape can be driven in either direction past a magnetic transducing head or heads by vacuum capstan rollers which are continuously rotated in opposite directions and to which vacuum can be selectively applied to control the direction of movement of the tape. In such apparatus sensing means are provided in order to determine the quantities of tape in the bins so that it can be arranged that as the tape is driven in one direction or the other by said vacuum capstan rollers, predetermined quantities of tape are maintained in the bins. Thus if tape is being withdrawn from one bin, more tape must be supplied to that bin from an associated spool, and likewise, when tape is being fed into a bin, tape must be withdrawn from said bin and wound onto the associated spool. The direction of movement of the tape between the bins is controlled by command signals which may be derived from a computer or manually and it will be appreciated that if at one instant a command signal is given to condition the apparatus to drive the tape in one direction driving means, such as electric motors, coupled to the supply spools become operative to feed tape into one bin or to remove tape from the other bin if the bin sensing means indicates the necessity of the removal of tape from or the supply of tape to the bins. If however a number of different command signals are rapidly given the various mechanical parts, such as relays, contactors and spool motors will be incapable of following the rapidly changing signals and control may be lost and damage due to overheating may result.

The object of the present invention is to provide an improved apparatus with a view to avoiding this difficulty and according to the invention there is provided apparatus for maintaining a predetermined quantity of an elongated medium at a predetermined zone comprising driving means for driving said medium into or out of a predetermined zone, supply means for feeding said medium to or withdrawing said medium from said zone, selecting means for selectively operating said driving means to move said medium into or out of said zone and to condition said supply means to withdraw said medium from or feed said medium to said zone, sensing means responsive to the quantity of said medium in said zone, and control means for said supply means responsive to said selecting means and said sensing means to initiate operation of said supply means in a sense to remove medium from said zone when the amount of medium therein exceeds a predetermined quantity and when said driving means is operative to move medium into said zone, and to initiate operation of said supply means in a sense to feed medium to said zone when the amount of medium therein is less than a predetermined quantity and when said driving means is operative to move medium out of said zone, and means, operative only after operation of said supply means in a particular sense has been initiated in response to both said selecting means and said sensing means, for maintaining such operation in response to said sensing means but independently of said selecting means.

Preferably said medium is fed to or withdrawn from a container which thus constitutes said zone.

Figure 2:
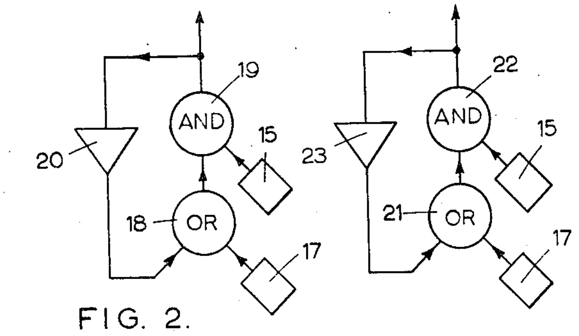
Figure 3:
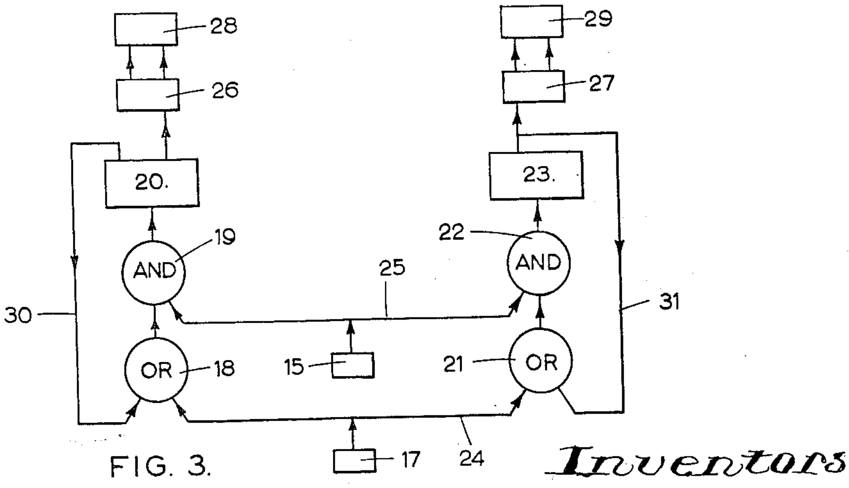

In order that the said invention may be clearly understood and readily carried into effect, it will now be more fully described with reference to the accompanying diagrammatic drawings, in which:

FIGURE 1 illustrates a typical form of magnetic tape transducing apparatus to which the invention is particularly applicable, FIGURE 2 illustrates diagrammatically a circuit arrangement suitable for use in the apparatus shown in FIGURE 1, and FIGURE 3 illustrates a circuit arrangement embodying the principles of FIGURE 2.

The invention is particularly applicable to magnetic transducing apparatus in which the medium is in the form of magnetisable tape which may be 1″ wide and may be required to be driven in either direction at about 200″ per second. A typical construction of transducing apparatus is shown in FIGURE 1 which comprises supply means which in the present embodiment comprises a pair of supply spools 1 and 2 on which the ends of the tape are wound and driven respectively by reversible electric motors 3 and 4. The supply means serve to maintain a predetermined supply of tape at two zones formed by a pair of storage containers or bins 5 and 6 in which the tape is contained in the form of free folds or loops. These containers maintain a supply of tape which can be driven from one container to the other in either direction over a supporting surface 7 past magnetic transducing heads 8. The tape is driven past the heads 8 by means of driving means comprising a pair of vacuum capstan rollers 9 and 10 which are continuously rotated in opposite directions by electric motors 11 and 12. Suction can be selectively applied to the capstan roller 9 and 10 so as to control the direction of movement of the tape from a source of vacuum indicated at 13. It is desirable to maintain a predetermined quantity of tape in the bins 5 and 6 and it will be appreciated that when tape is being driven by the capstan roller 9 into the bin 5 the spool 1 will be required to rotate in a direction to withdraw tape from the bin 5 and when the capstan roller 10 is operative so that the quantity of tape in the bin 5 falls, the spool 1 will be required to rotate in a direction to feed tape into the bin 5. Similar requirements exist so far as the bin 6 is concerned. In order to determine the quantities of tape in the bins 5 and 6 sensing means of any suitable construction are employed to determine when the quantity of tape in each bin is in excess of or below a predetermined amount. The sensing means employed may be capacitive sensing means as disclosed in the specification of co-pending United States patent application Serial No. 839,319. Such capacitive sensing means is indicated in FIGURE 1 by electrodes 14*a* and 14 and capacity measuring devices 15 and 16 which provide signals as hereafter referred to. Other suitable sensing means may however be employed.

The apparatus shown in FIGURE 1 is actuated to drive the tape to go left or go right by means of command signals, such command signals being derived for example from a computer or manually, the source of command signals being indicated at 17. The command signals serve to control the application of suction to one or other of the capstan roller 9 or 10 and to condition the motors 3 and 4 so that these motors will be capable (when energised) of rotating the supply spools 1 and 2 in directions corresponding to the direction in which the tape is driven by the capstan roller 9 or 10 so as to maintain predetermined quantities of tape in the bins 5 and 6. When a command signal is given for example to cause the tape to move in a left-hand direction over the surface 7 into the bin 5, the capstan roller 9 has suction applied thereto and the motor 3 will be conditioned so that when energised it will rotate the spool 1 in an anticlockwise direction to withdraw tape from the bin 5. Since the feeding of tape into the bin 5 by the capstan roller 9 will cause the quantity of tape in the bin 5 to exceed the predetermined amount the motor 3 coupled to the spool 1 is then energised so as to rotate the spool 1 so as to withdraw tape from the bin 5. If a series of different command signals are rapidly given the aforesaid difficulties may arise and in accordance with the present invention, control means indicated at 17*a* are provided whereby if a command signal is changed to reverse the direction of movement of the tape the supply means continues to remain in its original condition until the sensing means indicates that a predetermined quantity of tape is in the bin. In the following description the bin will be regarded as empty when the quantity of tape is below a predetermined quantity and the bin full when the tape exceeds such predetermined quantity. Thus when a bin is empty more tape must be fed thereinto from the associated spool and likewise when the bin is full tape must be removed therefrom and wound onto the associated spool. The sensing means described in the specification of the aforesaid co-pending application may be arranged to provide a continuous signal of, say, plus 3 volts indicating that a bin is full and needs emptying and a continuous signal of, say, minus 3 volts indicating that a bin is empty and needs filling. The command signals may also be continuous signals and a continuous positive signal of, say, 3 volts amplitude may correspond to the driving of the tape by the capstan roller 9 in a left-hand direction and a negative signal of, say, 3 volts amplitude may correspond to the driving of the tape by the capstan roller 10 in a right-hand direction.

The control means 17*a* includes electronic gating circuits hereinafter referred to as "gates." Such circuits are well known in the electronic art. AND and OR gates are employed in the circuits shown in FIGURES 2 and 3, typical gates of these types being shown in the book "Faster Than Thought" by Bowden published by Pitman, 1953. As shown in FIGURE 2 there is provided an OR gate 18 having in series therewith an AND gate 19, there being provided between the output of the gate 19 and an input to the gate 18 an amplifier 20. A further OR gate 21 is provided in series with another AND gate 22 and between the output of the gate 22 and an input to the gate 21 a further amplifier 23 is provided. When the apparatus is required to drive the tape in a left hand direction by means of the capstan roller 9 into the bin 5 the appropriate command signal is applied from the source 17 to one input of the OR gate 18 which opens the gate 18 so that a positive signal is fed to the AND gate 19. To the AND gate 19 there is also fed a signal from the bin sensing means 15 associated with the bin 5 and if the bin sensing means 15 indicates that the bin 5 is full and needs emptying such a signal is a positive signal and the gate 19 then opens so as to provide a signal to energise the motor 3 driving the spool 1 to rotate the latter in a direction to empty the bin 5. The energisation of the motor 3 may be effected by relays hereinafter referred to in FIGURE 3. The opening of the gate 19 to provide such a signal causes the amplifier 20 to feed back a positive signal into the gate 18 so that this gate remains open even though the command signal applied to gate 18 may be altered in such a sense as to actuate the apparatus for driving the tape in a right-hand direction. The amplifier 20 continues to maintain the gate 18 open until the signal supplied from the bin sensing means changes its polarity to indicate that the bin is empty so that when the signal from the bin sensing means becomes negative the gate 19 is closed and hence the motor 3 driving the spool in a winding up direction is stopped and the amplifier 20 no longer feeds back a signal to the gate 18. When it is desired to drive the tape in a right-hand direction into the bin 6 by means of the capstan roller 10 a right-hand command signal is applied to the OR gate 21 so that this gate opens and passes a signal to the AND gate 22, and if the bin sensing means 15 associated with the bin 5 feeds a signal to the gate 22 which indicates that the bin 5 is empty and needs filling, then the gate 22 opens so as to energise the motor 3 driving the spool 1 thus causing the motor 3 to rotate the spool 1 in an unwinding direction so as to feed tape into the bin 5. When the AND gate 22 opens, the amplifier 23 feeds back a signal to the OR gate 21 as a result of which the OR gate 21 remains open even if the command signal applied to the gate 22 is changed in polarity. The spool 1 continues to rotate in an unwinding direction until the signal applied to the AND gate 22 from the bin sensing means 15 associated with the bin 5 indicates that the bin is full when the AND gate 22 closes so as to de-energise the motor 3 driving the spool 1 and a signal is no longer fed back by the amplifier 23.

From the foregoing description it will be appreciated that the OR gate 18 opens whenever a positive command signal is fed thereto and remains open so long as a positive signal is fed thereto either in the form of a command signal or in the form of a feedback signal from the amplifier 20. The OR gate 21 operates in a similar manner in respect of negative command and feedback signals. The AND gate 19 opens and is maintained open in response to the feeding thereto of positive signals from both the OR gate 18 and the bin sensing means 15. The AND gate 22 operates in a similar manner in respect of negative signals from the OR gate 21 and the bin sensing means 15. It should be noted that the AND gates 19 and 22 can never be open simultaneously because if a positive bin sensing signal is fed to the AND gate 19 the same signal is fed to the AND gate 22, so that the latter AND gate cannot open. Similarly if a negative bin sensing signal is fed to the AND gate 22 the same signal applied to the AND gate 19 will keep the latter AND gate closed.

Gates and amplifiers similar to the gates 18, 19, 21 and 22 and amplifiers 20 and 23 are associated with the bin 6 and are similarly fed with command signals and signals from the bin sensing means 16 associated with the bin 6 so as to control the conditioning and energisation of the motor 4 driving the spool 2.

FIGURE 3 of the drawings indicates a preferred arrangement of gating circuits which can be employed to avoid the provision of separate supply leads to the gates 18, 19, 21 and 22. In this figure the gates 18 and 21 are interconnected by a conductor 24 to which the left (positive) or right (negative) command signals from the source 17 are applied, and the gates 19 and 22 are interconnected by a lead 25 to which positive or negative signals from the bin sensing means 15 associated with the bin 5 are applied. The gates 19 and 22 feed into the amplifiers 20 and 23, the outputs of the amplifiers being fed into amplifiers 26 and 27 respectively which are current amplifiers feeding relays 28 and 29 which serve to control the energisation of the motor 3 driving the spool 1 so as to cause said motor to be conditioned to wind up or unwind. Feedback connections from the amplifiers 20 and 23 to the gates 18 and 21 are afforded by the leads 30 and 31.

The gates 18 and 19 function in a manner similar to that described with reference to FIGURE 2 in that if the gates 18 and 19 receive respectively a positive command signal and a positive bin sensing signal the gate 19 opens and a positive signal is fed back from the amplifier 20 to the gate 18, so that the gate 18 is maintained open so long as the positive bin sensing signal is fed to the gate 19. The amplifier 20 also delivers a signal of negative polarity to the amplifier 26 which in turn effects actuation of the relay 28 so that the motor 3 coupled to the spool 1 is energised to rotate the spool 1 in its winding-up direction. Then, as soon as the bin sensing signal changes to negative polarity thereby indicating that the bin is empty, the AND gate 19 closes, whereupon, signals disappear in the amplifiers 20 and 26, the relay 28 is de-energised, and the OR gate 18 closes unless the common signal applied thereto is positive.

The control arrangement for controlling energisation of the motor 3 coupled to the spool 1 to rotate the latter in an unwinding direction operates in a similar manner in respect of command and bin sensing signals of negative polarity. Thus when a command signal of negative polarity is fed to the OR gate 21, this gate opens and passes a signal of negative polarity to the AND gate 22. If at this time the bin is empty so that a bin sensing signal of negative polarity is also fed to the AND gate 22, this gate opens and feeds a signal of negative polarity to the amplifier 23, so that a feedback signal of negative polarity is fed to the OR gate 21 over the lead 31, whereby the OR gate 21 is maintained open. The amplifier 23 feeds a signal of negative polarity to the amplifier 27 which in turn effects energisation of the relay 29 so that the motor 3 coupled to the spool 1 is energised to rotate the spool 1 in an unwinding direction so as to feed tape into the bin 5. Even if the polarity of the command signal changes to positive the OR gate 18 is maintained open and feeding of tape into the bin 5 continues until the bin sensing signal changes its polarity to positive corresponding to a full bin whereupon the AND gate 22 closes, with the result that the feedback signal of negative polarity is no longer fed to the OR gate 21, and if, at this time, the command signal is not of negative polarity, the OR gate 21 closes. When the signal disappears in the amplifier 23 the amplifier 27 is no longer effective to energise the relay 29 so that the motor 3 coupled to the spool 1 is de-energised and feeding of tape into the bin 5 ceases.

It will be appreciated that in the arrangement described with reference to FIGURE 3, the relays 28 and 29 cannot be energised simultaneously. Furthermore once a bin emptying or filling operation has commenced in response to the simultaneous presence of a command signal of positive polarity and a bin sensing signal of positive polarity, or a command signal of negative polarity and a bin sensing signal of negative polarity, this operation will continue irrespective of a change of the polarity of the command signal until the bin sensing signal changes its polarity, thus indicating that the bin is full or empty as the case may be.

It will, of course, be understood that an arrangement similar to that shown in FIGURE 3 for use with the spool 1 and the bin 5 will be provided for use with the spool 2 and the bin 6.

What we claim is:

1. Apparatus for maintaining a predetermined quantity of an elongated medium at a predetermined zone comprising driving means for driving said medium into or out of a predetermined zone, supply means for feeding said medium to or withdrawing said medium from said zone, selecting means for selectively operating said driving means to move said medium into or out of said zone and to condition said supply means to withdraw said medium from or feed said medium to said zone, sensing means responsive to the quantity of said medium in said zone, and control means for said supply means responsive to said selecting means and said sensing means to initiate operation of said supply means in a sense to remove medium from said zone when the amount of medium therein exceeds a predetermined quantity and when said driving means is operative to move medium into said zone, and to initiate operation of said supply means in a sense to feed medium to said zone when the amount of medium therein is less than a predetermined quantity and when said driving means is operative to move medium out of said zone, and means, operative only after operation of said supply means in a particular sense has been initiated in response to both said selecting means and said sensing means, for maintaining such operation in response to said sensing means but independently of said selecting means.

2. Apparatus according to claim 1 wherein said zone is constituted by a container for said medium.

3. Apparatus according to claim 1, wherein said driving means includes a vacuum capstan roller and said selecting means serve to control the application of suction to said roller.

4. Magnetic tape transducing apparatus comprising a tape container, driving means for driving said tape into or out of said container, supply means for feeding said tape into or withdrawing said tape from said container, selecting means for selectively operating said driving means to move said tape into or out of said container and to condition said supply means to withdraw said tape from or feed said tape into said container, sensing means responsive to the quantity of tape in said container and control means for said supply means responsive to said selecting means and said sensing means to initiate operation of said supply means in a sense to remove tape from said container when the amount of tape therein exceeds a predetermined quantity and when said driving means is operative to move tape into said container, and to initiate operation of said supply means in a sense to feed tape into said container when the amount of tape therein is less than a predetermined quantity and when said driving means is operative to move tape out of said container, and means, operative only after operation of said supply means in a particular sense has been initiated in response to both said selecting means and said sensing means, for maintaining such operation in response to said sensing means but independently of said selecting means.

5. Apparatus for maintaining a predetermined quantity of an elongated medium at a predetermined zone comprising driving means for driving said medium into or out of a predetermined zone, supply means for feeding said medium to or withdrawing said medium from said zone, selecting means for selectively operating said driving means to move said medium into or out of said zone and to condition said supply means to withdraw said medium from or feed said medium to said zone, sensing means responsive to the quantity of said medium in said zone, and control means for said supply means including electrical gating circuits each having an "OR" gate and an "AND" gate in series with each other and a feedback path from said "AND" gate to said "OR" gate means for feeding a signal from said selecting means to said "OR" gate and means for feeding a signal from said sensing means to said "AND" gate, the output from said "AND" gate being used to control said supply means to initiate operation of said supply means in a sense to move medium from said zone when the amount of medium therein exceeds a predetermined quantity and when said driving means is operative to move medium into said zone, and to initiate operation of said supply means in a sense to feed medium to said zone when the amount of medium therein is less than a predetermined quantity and when said driving means is operative to move medium out of said zone, and whereby once operation of said supply means in a particular sense has been initiated in response to both said selecting means and said sensing means such operation is maintained so long as said sensing means feeds a signal to said "AND" gate in the absence of a signal applied to said "OR" gate from said selecting means.

References Cited in the file of this patent

UNITED STATES PATENTS

| | | |
|---|---|---|
| 2,730,309 | Baer | Jan. 10, 1956 |
| 2,838,250 | Stavrakis | June 10, 1958 |
| 2,864,609 | Trimble | Dec. 16, 1958 |
| 2,954,911 | Baumeister et al. | Oct. 4, 1960 |
| 2,998,206 | Pendleton | Aug. 29, 1961 |